March 17, 1959  A. P. HAYDEN  2,877,963
DEVICE FOR PAYING OFF MATERIAL AND APPLYING BACK TENSION
Filed Oct. 20, 1954
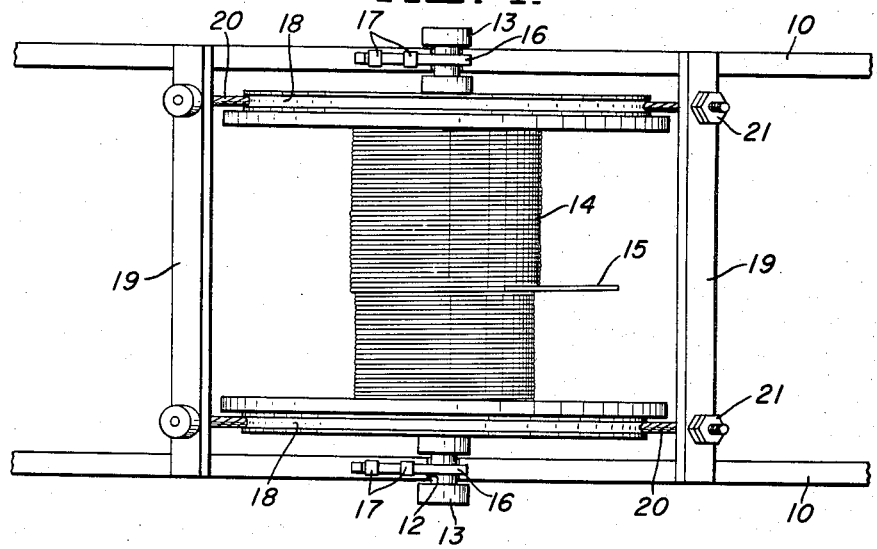
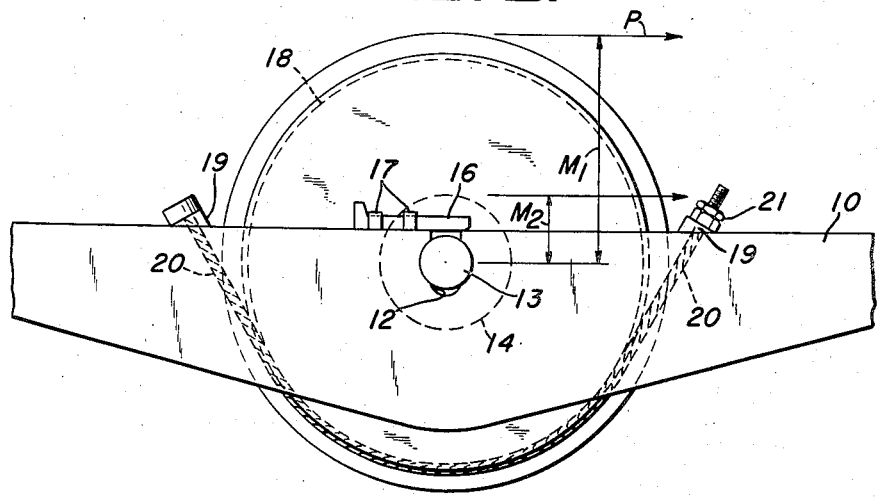
INVENTOR:
ALBERT P. HAYDEN,
BY: Donald G. Dalton
his Attorney.

United States Patent Office 2,877,963
Patented Mar. 17, 1959

2,877,963

DEVICE FOR PAYING OFF MATERIAL AND APPLYING BACK TENSION

Albert P. Hayden, East Haven, Conn., assignor to United States Steel Corporation, a corporation of New Jersey Application October 20, 1954, Serial No. 463,571

2 Claims. (Cl. 242—156)

This invention relates to a device for paying off material and applying back tension thereto.

Although the invention has general utility and is not limited to use with any specific machine or material, it is especially suited for feeding wires or strands into a wire stranding or laying machine which twists them together to form a strand or rope. In operating such machines it is necessary to apply back tension to the wires or strands and to maintain this tension within an established range. The usual way of applying such tension is to pull the wires or strands into the machine from a rotatable spool equipped with an adjustable brake. As the material on a spool is depleted, the moment arm through which the pulling force acts to turn the spool becomes shorter. Thus with a constant braking moment opposing rotation of the spool, the tension in the material would increase. On a nearly empty spool the tension might be triple or quadruple that on a full spool. Usually the only way to vary the braking moment is through manual adjustment, and the tension range actually maintained depends on the skill of the operator.

An object of the present invention is to provide an improved pay off and back tensioning device which automatically compensates for the shortened moment arm as material on a spool is depleted and yet is of simplified construction.

A further object is to provide an improved pay off and back tensioning device in which the weight of the spool and material thereon is carried by brake bands, the weight loss as the material is depleted compensating for the shortened moment arm.

In accomplishing these and other objects of the invention, I have provided improved details of structure, a preferred form of which is shown in the accompanying drawing, in which:

Figure 1 is a top plan view of a pay off and back tensioning device constructed in accordance with my invention; and Figure 2 is a side elevational view of the device shown in Figure 1.

My pay off and tensioning device comprises a cradle 10 whose upper edges contain a pair of relatively deep aligned recesses 12 on opposite sides. These recesses receive trunnions 13 of a spool 14 which carries flexible material 15 to be payed off. The trunnions are retained in the recesses by slidable latches 16 mounted in guide loops 17 fixed to the upper edges of the cradle. The opposite ends of the spool have braking surfaces in the form of circumferential grooves 18. The cradle includes a pair of cross bars 19 to which a pair of flexible brake bands 20 are attached at their opposite ends. Preferably one end of each band carries nuts 21 to permit adjustment in the effective length of the band. The spool 14 is supported with its grooves 18 receiving the respective brake bands 20 and its trunnions 13 free of the bottoms of the recesses 12.

When material 15 is payed off the spool 14, it is pulled with an external force represented by P in Figure 2. The length of the moment arm through which this force acts to turn the spool varies between extremes indicated at $M_1$ and $M_2$, the former being approximately quadruple the latter. If a constant turning moment were required to turn the spool, the force necessary would increase in direct proportion to the amount by which the arm is shortened. Hence the tension in the material likewise would increase as the material is unwound. In the example illustrated the tension ultimately would become approximately four times its initial value.

With my pay off device the braking moment which opposes the turning moment is proportional to the combined weight of the spool and material resting on the brake bands 20. Consequently the braking moment decreases progressively as the weight of material on the spool diminishes. As the moment arm M becomes shorter, the moment needed to turn the spool also decreases. Hence there is no undue increase in the pulling force nor in the tension in the material. The compensation is sufficiently accurate that the tension remains within the established operating range, even though not mathematically exact.

From the foregoing description it is seen that my device automatically compensates for variations in the length of the moment arm as the material on a spool is depleted. Furthermore there is no manual adjustment needed with a change in spools. The latter operation is also facilitated, since it is only necessary to slide the latches free of the trunnions to remove an exhausted spool and replace it with a full spool.

While I have shown and described only a single embodiment of the invention, it is apparent that modifications may arise. Therefore, I do not wish to be limited to the disclosure set forth but only by the scope of the appended claims.

I claim:

1. A device for paying off flexible material and applying back tension thereto comprising a cradle having aligned recesses on opposite sides, a pair of brake bands having both ends fixed to said cradle inwardly of said recesses and depending therebelow, a spool having trunnions received in said recesses but being free of the bottoms thereof, and a pair of braking surfaces on said spool spaced inwardly of said trunnions and being of substantially larger radius than the trunnions and resting on said bands to carry the weight of the spool.

2. A device as defined in claim 1 including latches carried by said cradle over the respective recesses for retaining the trunnions therein but being free of engagement with the trunnions.

References Cited in the file of this patent

UNITED STATES PATENTS

| | | |
|---|---|---|
| 1,270,279 | Ferres | June 25, 1918 |
| 1,569,650 | Coldwell | Jan. 12, 1926 |
| 2,285,939 | Neumair | June 9, 1942 |
| 2,662,702 | Bruestle | Dec. 15, 1953 |